(12) United States Patent
Kang

(10) Patent No.: US 7,226,013 B1
(45) Date of Patent: Jun. 5, 2007

(54) FISHING REEL HAVING IMPROVED PAY OUT CLICKING MECHANISM

(75) Inventor: Young Kang, Columbia, SC (US)

(73) Assignee: Shakespeare Company, LLC, Columbia, SC (US)

( * ) Notice: Subject to any disclaimer, the term of this patent is extended or adjusted under 35 U.S.C. 154(b) by 0 days.

(21) Appl. No.: 10/983,880

(22) Filed: Nov. 8, 2004

(51) Int. Cl.
   *A01K 89/16* (2006.01)
   *A01K 89/00* (2006.01)
(52) U.S. Cl. ..................... 242/306; 242/317
(58) Field of Classification Search ........... 242/306, 242/308, 317
   See application file for complete search history.

(56) References Cited

U.S. PATENT DOCUMENTS

| | | | |
|---|---|---|---|
| 3,481,554 A | 12/1969 | Hull | |
| 3,488,015 A | 1/1970 | Taggart | |
| 4,154,414 A | 5/1979 | Shepherd | |
| 4,168,041 A * | 9/1979 | Moosberg | 242/295 |
| 4,378,914 A | 4/1983 | Shackelford et al. | |
| 4,474,341 A | 10/1984 | Shackelford et al. | |
| 4,477,038 A * | 10/1984 | Yorikane | 242/308 |
| 4,728,054 A * | 3/1988 | Pisapio | 242/258 |
| 4,796,828 A | 1/1989 | Councilman | |
| 5,297,758 A * | 3/1994 | Hitomi | 242/307 |
| 5,348,245 A | 9/1994 | Sugawara | |
| 5,427,325 A | 6/1995 | Weaver | |
| 5,556,050 A | 9/1996 | Baisch et al. | |
| 5,564,640 A | 10/1996 | Egasaki et al. | |
| 5,857,632 A * | 1/1999 | Arkowski | 242/297 |
| 6,189,822 B1 * | 2/2001 | Ikuta | 242/296 |
| 6,299,086 B1 | 10/2001 | Li et al. | |
| 6,375,107 B1 | 4/2002 | Wong | |
| 6,641,070 B1 | 11/2003 | Wong | |
| 6,726,137 B1 | 4/2004 | Li | |
| 6,827,306 B1 | 12/2004 | Datcuk, Jr. | |
| 2002/0020772 A1 * | 2/2002 | Norris | 242/282 |
| 2005/0006512 A1 * | 1/2005 | Morimoto et al. | 242/306 |

* cited by examiner

*Primary Examiner*—Emmanuel Marcelo
*Assistant Examiner*—Evan Langdon
(74) *Attorney, Agent, or Firm*—Nelson Mullins Riley & Scarborough LLP

(57) ABSTRACT

A fishing reel includes a clicking mechanism that produces an audible indication when fishing line is payed out from a rotatable line spool. The audible indication is created by the interaction of a clicking member and a flexibly mounted tab. The clicking mechanism is constructed such that the audible indication will not occur as the crank handle is being turned by a user to retrieve the fishing line.

33 Claims, 5 Drawing Sheets

FISHING REEL HAVING IMPROVED PAY OUT CLICKING MECHANISM

BACKGROUND OF THE INVENTION

The present invention relates generally to fishing reels, and more particularly to clicking mechanisms for conventional trolling/bait cast fishing reels that produce an audible indication when fishing line is payed out.

Conventional trolling/bait cast fishing reels are known to include mechanisms that create a clicking noise when fishing line is payed out from the reel, such as when a fish takes a bait. This clicking noise is also audible, however, while the user reels in the fishing line. While the user typically has the option of disengaging the clicking mechanism, such disengagement will also prevent clicking during pay out. It is thus desirable to have a fishing reel employing a clicking mechanism that automatically creates a clicking noise while the fishing line pays out but does not when the fishing line is retrieved.

SUMMARY

The present invention recognizes and addresses considerations of prior art constructions and methods.

According to one aspect, the present invention provides a fishing reel comprised of a line spool, a reel frame carrying the line spool, and a bait click mechanism. The line spool is capable of rotating in first and second opposite rotational directions. The bait click mechanism provides an audible indication when fishing line is payed out in the line spool's first rotational direction. The bait click mechanism remains substantially silent when fishing line is retrieved in the line spool's second opposite rotational direction.

In some embodiments, the bait click mechanism employs a pawl and ratchet wheel arrangement. In this arrangement, the pawl preferably rotates with the line spool. For example, the pawl may be attached to the line spool with a suitable mounting plate.

In addition, the bait click mechanism may include a tab flexibly connected to the reel frame and a clicking member mechanically linked to the ratchet wheel. The clicking member may have at least one protrusion extending radially outward. When this protrusion comes into contact with the tab, an audible indication is created.

The accompanying drawings, incorporated in and constituting part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
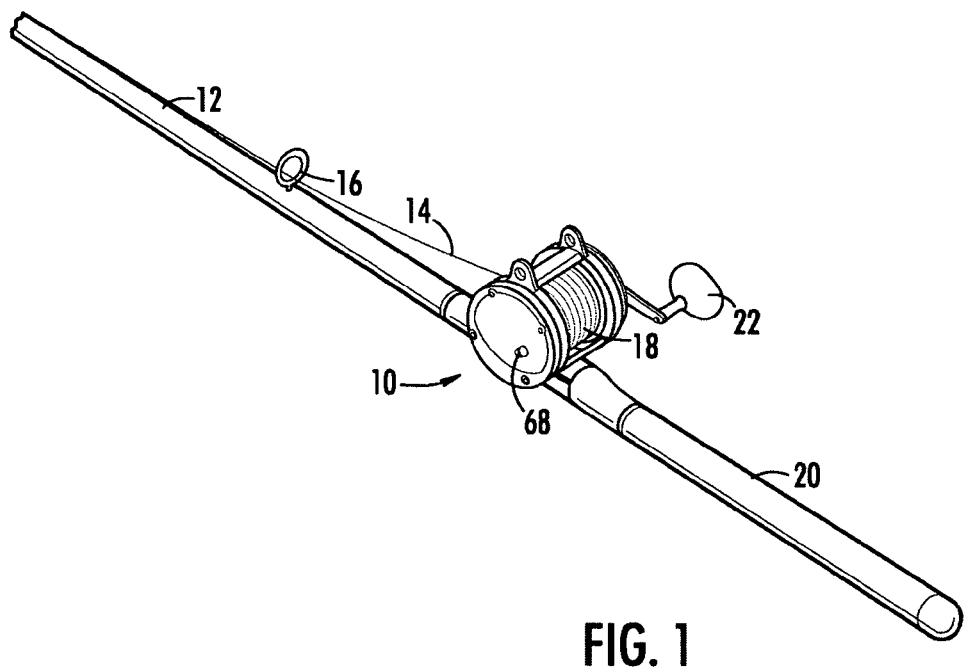
FIG. 1 is a perspective view of a trolling/bait cast fishing reel mounted on a fishing rod, the reel being constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to the drawings, and particularly to FIG. 1, a reel 10 according to the present invention is shown attached to a fishing rod 12. As one skilled in the art will appreciate, reel 10 is of the type referred to as a trolling/bait cast reel although principles of the present invention may apply to other reel types as well. Fishing line 14 is fed through line guide 16, up fishing rod 12, and attaches to bait or a fishing lure (not shown). A user might hold fishing rod 12 at handle 20, or at any other convenient location.

Fishing reel 10 includes a crank handle 22 for winding fishing line 14 onto line spool 18 (which is rotatably mounted within reel frame 21 as shown). In particular, crank handle 22 is operatively connected to line spool 18 through a drive mechanism (not shown) within the right side of reel 10. Reel frame 21 further includes a typical mounting foot 23 for attachment to rod 12.

A shaft 24 extends through the middle of reel 10 for rotatably supporting line spool 18, subject to the drag imposed by the reel's drag mechanism. In this regard, one or more ball bearing assemblies 26 form an interface between line spool 18 and shaft 24 on either side of reel 10. A bait click mechanism 28 is provided under a left side cover 30, which is attached to reel frame 21 with screws or other suitable fasteners.

Figure 3:
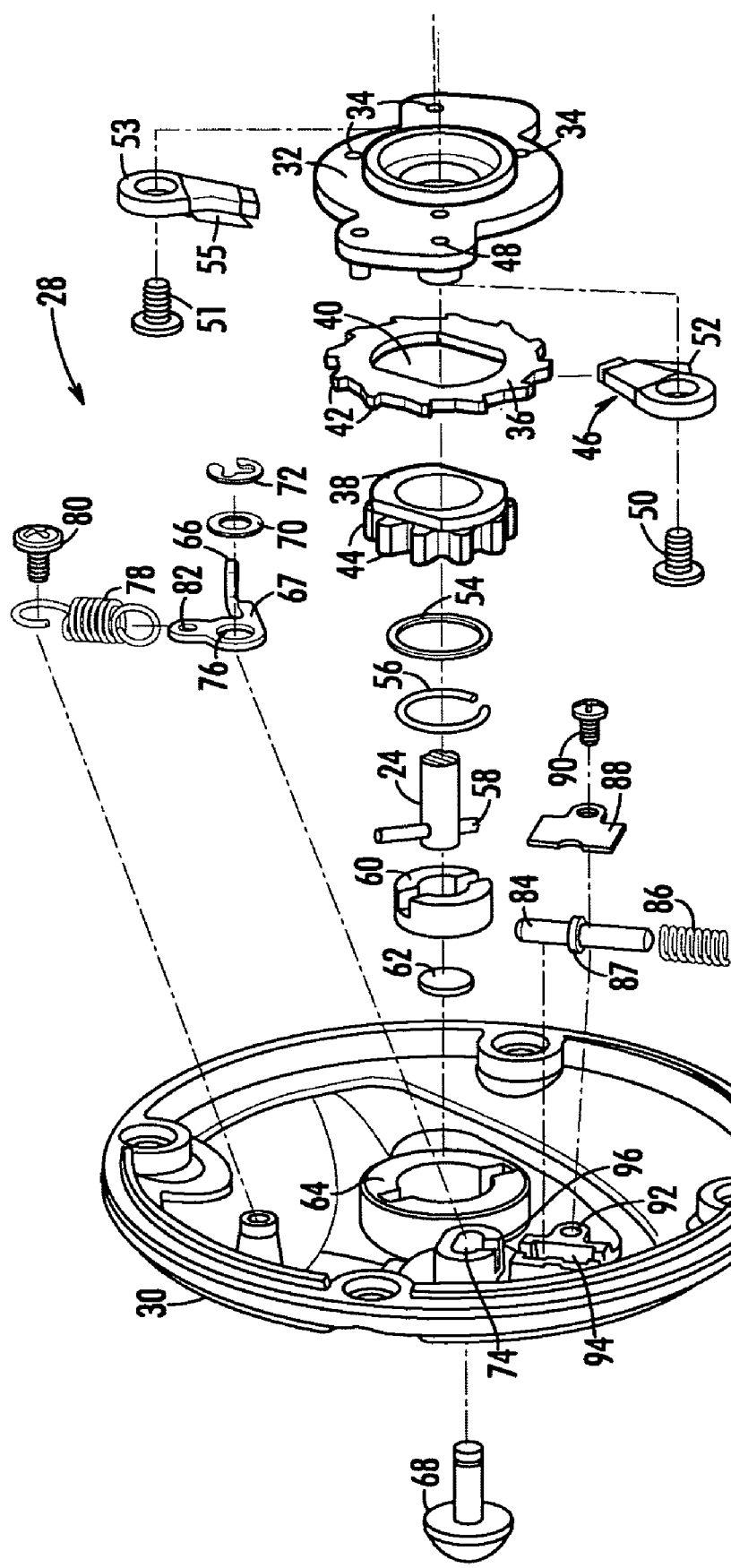
FIG. 3 is a perspective exploded view showing internal components from one side of the fishing reel of FIG. 1.
Figure 4:
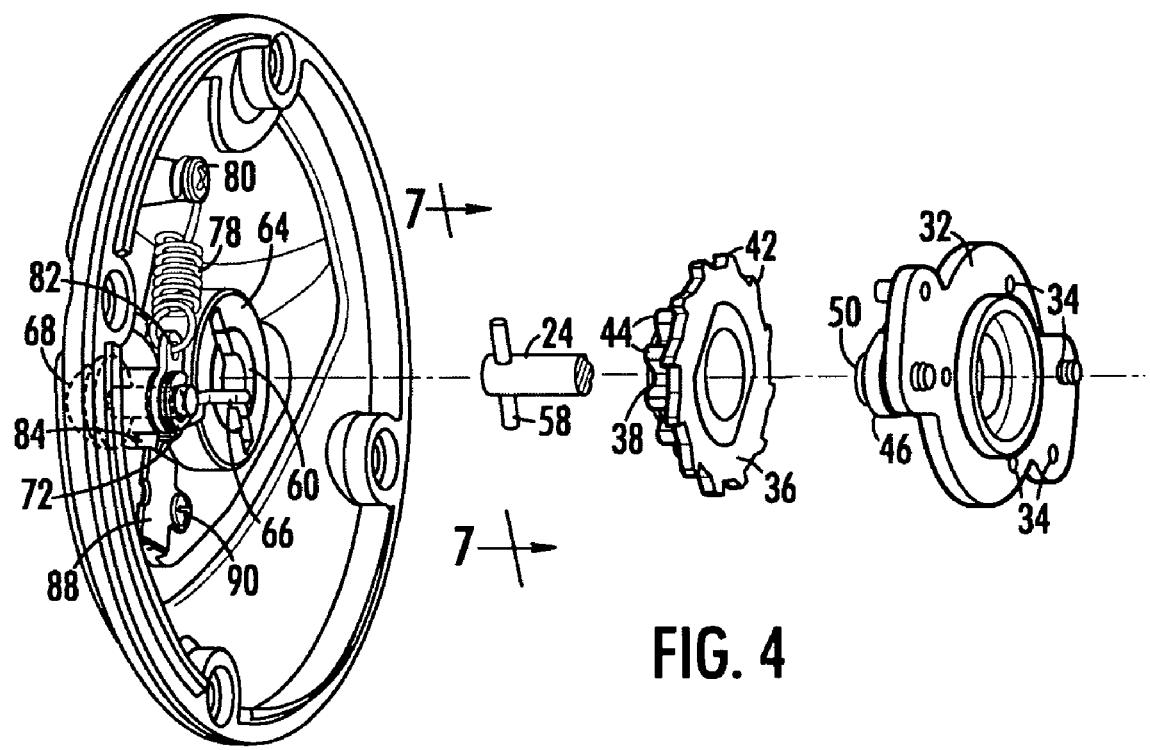
FIG. 4 is a partially assembled view of the components shown in FIG. 3.

The component parts of bait click mechanism 28 are shown in FIG. 3 in an exploded view. A mounting plate 32 is attached to the outside flange wall of line spool 18 by any suitable means such as screws (not shown) extending through screw holes 34. Alternatively, mounting plate 32 can be formed as an integral part of the line spool itself. A ratchet wheel 36 seats against but is capable of free rotation with respect to mounting plate 32. Mounting plate 32 preferably is constructed of wear-resistant plastic so that ratchet wheel 36 may rotate against the mounting plate without damaging the mounting plate over time.

A clicking gear 38 is located adjacent to ratchet wheel 36 and includes a configured portion seated in hole 40 of ratchet wheel 36. Ratchet wheel 36 includes ratcheting steps 42 about its circumference and is preferably made of aluminum or stainless steel. Clicking gear 38 includes multiple clicking teeth 44 located around its circumference. The number of clicking gear teeth may be selected to achieve a desired clicking frequency. As one skilled in the art will appreciate, a larger number of clicking gear teeth will result in more clicks per rotation of line spool 18. Clicking gear 38 is preferably constructed of wear-resistant plastic, but other suitable materials could also be used.

A pawl 46 mounts about a boss encircling mounting hole 48 and is secured with screw 50. Pawl 46 is preferably constructed of metal or other suitable material. As can be seen, pawl 46 has a U-shaped sheath 52 protruding from the body of the pawl. Sheath 52, which may be constructed of spring steel or the like, lightly engages (i.e., presses against) either side of ratchet wheel 36 so that the ratchet wheel and pawl axially align.

Figure 5:
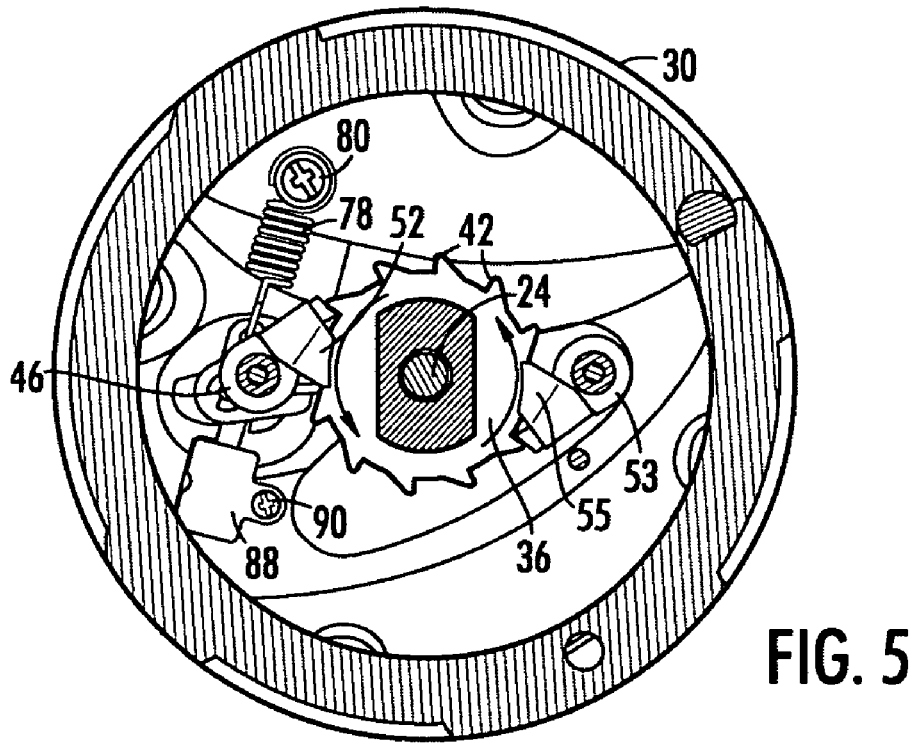
FIG. 5 is a side view in partial cross section showing the bait click mechanism wherein pawls are engaged with a ratchet wheel.
Figure 6:
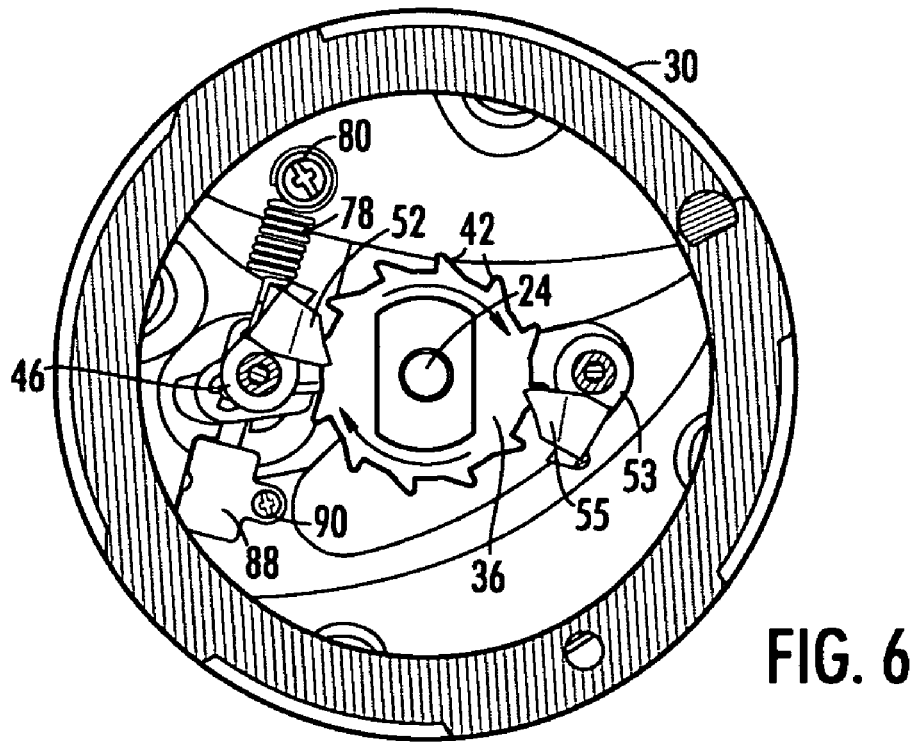
FIG. 6 is the same as FIG. 5 except that the pawls are not engaged with the ratchet wheel.

Ratcheting is the condition where ratchet wheel 36 spins with pawl 46 sliding over ratcheting steps 42 (see FIG. 6). Sheath 52, by lightly gripping ratchet wheel 36, provides sufficient frictional force to urge pawl 46 into contact with ratchet wheel 36 when the ratchet wheel spins in the opposite rotational direction (see FIG. 5). That is, if ratcheting occurs in a first rotational direction (see FIG. 6), then pawl 46 and ratchet wheel 36 engage in a second opposite rotational direction (see FIG. 5).

Optionally, a second pawl 53 may be mounted opposite to pawl 46. The second pawl includes a sheath 55 and is secured to mounting plate 32 with screw 51. The addition of second pawl 53 decreases the total load upon each pawl when the pawls engage ratchet wheel 36, and also provides balance to the system.

Figure 2:
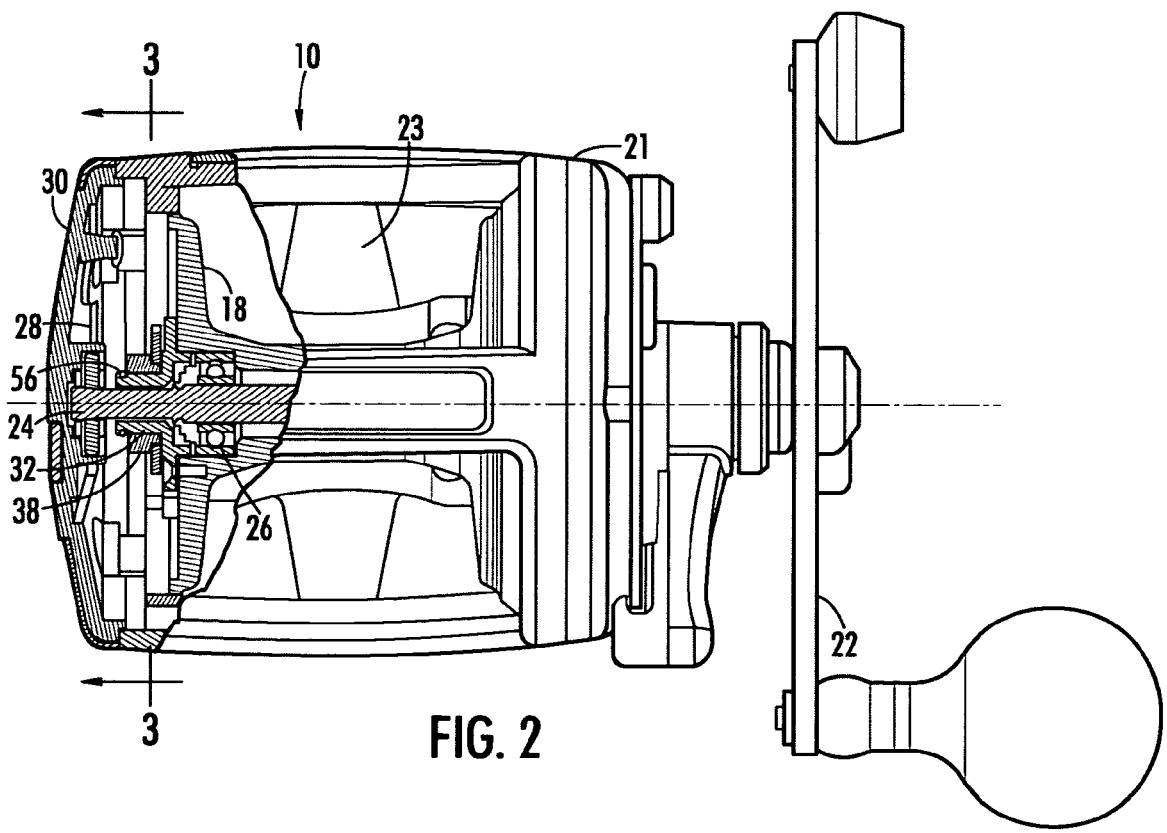
FIG. 2 is a partially cut-away top view of the fishing reel of FIG. 1.

Referring now specifically to FIGS. 2 and 3, washer 54 and retaining ring 56 preferably secure ratchet wheel 36 and clicking gear 38 on a cylindrical extension of mounting plate 32 extending away from line spool 18 coaxially with shaft 24. Shaft 24 protrudes beyond clicking gear 38 and has a transverse pin 58 extending through a hole near the distal end of shaft 24. The distal end of shaft 24 and pin 58 sit within annular bushing 60 and against plate bushing 62. Bushings 60 and 62 are fixed within bushing seat 64, which is integral with cover 30 as shown. Pin 58 and the matching cut-outs in bushing 60 and seat 64 prevent shaft 24 from twisting relative to reel frame 21.

FIGS. 5 and 6 show a view of the bait click mechanism cut-away between ratchet wheel 36 and mounting plate 32. In these Figures, the reel is shown from the inside of the reel looking out, with cover 30 as the background. In FIG. 5, pawls 46 and 53 are engaged with ratchet wheel 36. This condition occurs when line spool 18 rotates in a first rotational direction. Pawls 46 and 53 are not engaged with ratchet wheel 36 in FIG. 6, which occurs when line spool 18 rotates in the second opposite rotational direction. In this second opposite rotational direction, pawls 46 and 53 ratchet against ratchet wheel 36 (i.e., ride over ratcheting steps 42).

Referring to FIGS. 3, 4, 7A, and 7B, a flexible tab 66 is used to create a clicking noise. In this case, tab 66 is part of a pivotal member 67 retained on the stalk of clicking selector 68. In particular, the stalk of clicking selector 68 passes through a boss 74 in cover 30 and a hole 76 in pivotal member 67 and is retained by washer 70 and C-clip 72. Preferably, member 67 is made of suitable metal such as spring steel, but could be made of any other suitable material. Boss 74 defines a slot in which clicking selector 68 can be laterally moved to turn the clicking mechanism on and off.

A spring 78 extends between a fixed point on cover 30 and pivotal member 67. In this embodiment, for example, spring 78 attaches to cover 30 by screw 80 and attaches to member 67 at hole 82. Spring 78 creates tension in tab 66 such that tab 66 resists radial deflection. The spring rate of spring 78 is selected to provide appropriate resistance to radial deflection in tab 66 so that clicking gear 38 and ratchet wheel 36 will not rotate in the second rotational direction of line spool 18 despite the frictional forces from sheaths 52 and 55. Specifically, the spring rate of spring 78 only need be sufficient to overcome the frictional forces between the rotating mounting plate 32/sheathes 52 and 55 and the non-rotating ratchet wheel 36/clicking gear 38.

Referring again specifically to FIG. 3, a pusher 84 and a compression spring 86 sit within a box 94 defined in cover 30. A plate 88, held in place by a screw 90 threaded into hole 92, covers box 94. A portion of pusher 84 protrudes through the end of box 94 and into boss 74 through cut-out 96. As shown, pusher 84 includes a flange 87 about its midsection against which spring 86 acts but which also retains pusher 84 in relation to box 94. Preferably, the pusher is constructed of metal but could be made of other suitable materials providing sufficient durability and rigidity.

The tip of pusher 84 not within box 94 exerts pressure against the stalk of clicking selector 68. As clicking selector 68 is urged to different sides of boss 74, pusher 84 resists this urging. The tip of pusher 84 is slightly rounded so that the tip engages the stalk of selector 68 in a cam-follower type engagement. When sufficient lateral force is exerted upon clicking selector 68, the tension from spring 86 on pusher 84 is overcome and clicking selector 68 moves to the opposite lateral side of boss 74. Pusher 84 then moves back into its extended position to retain selector 68.

Figure 7A:
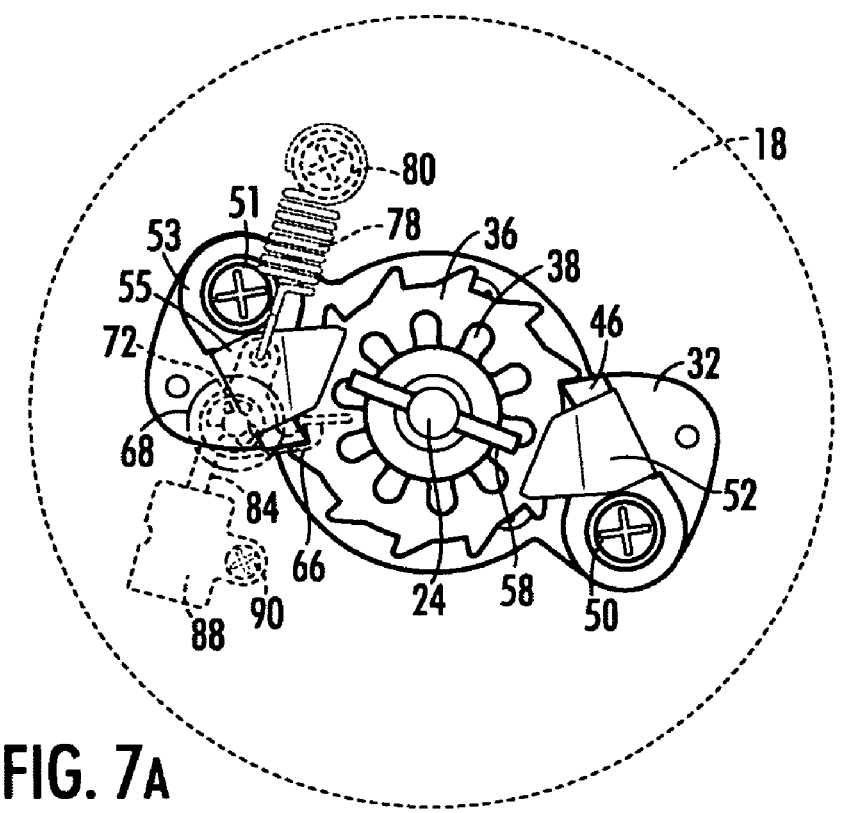
FIG. 7A is a side view of the bait click mechanism looking toward the flange of the line spool with a tab positioned for contact with a clicking member.
Figure 7B:
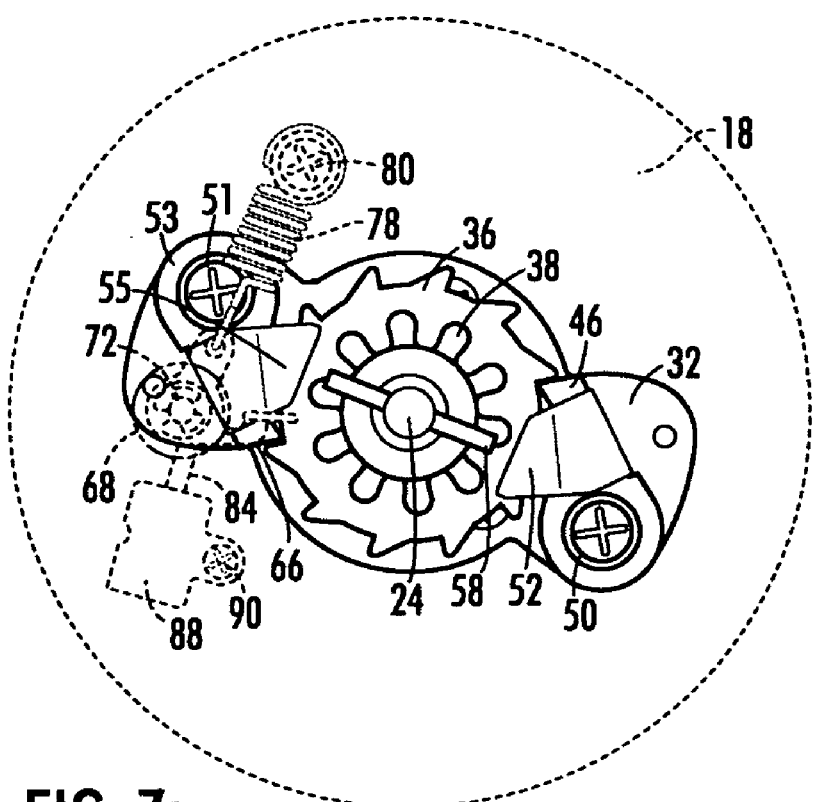
FIG. 7B is the same as FIG. 7A except the tab is positioned so that it cannot contact the clicking member.

The position of pusher 84 and clicking selector 68 in both positions within boss 74 can be seen in FIGS. 7A and 7B. In FIG. 7A, tab 66 is in a first position capable of contact with a tooth of clicking gear 38. In FIG. 7B, tab 66 is in a second position where the tab is not capable of contact with a tooth of clicking gear 38. When the tab is in the second position ("off"), no audible clicking will be produced from the clicking gear/tab arrangement when a fishing line pays out. When the tab is in the first position ("on"), however, an audible sound will be made when the fishing line pays out.

A closer look at FIGS. 6 and 7A shows why the bait click mechanism remains substantially silent while the fishing line is retrieved (which occurs when the user turns crank handle 22). FIG. 6 shows the condition where pawls 46 and 53 are ratcheting with respect to ratchet wheel 36. As previously noted, pawls 46 and 53 are connected to line spool 18, and thus the pawls must revolve about shaft 24 if line spool 18 is rotating.

Because ratchet wheel 36 and clicking gear 38 do not spin when pawls 46 and 53 are ratcheting, however, the bait click mechanism will remain substantially silent during retrieval even if tab 66 is "on." This is because the resistance provided by tab 66 is greater than the relatively small frictional force between spinning mounting plate 32 and stationary ratchet wheel 36. Clicking gear 38 presses against tab 66, but does not press with enough force to deflect tab 66.

With tab 66 in the position shown in FIG. 7A, engaged with clicking gear 38, an audible sound is created if clicking gear 38 rotates with sufficient force to move tab 66. Sufficient force is present when, as in FIG. 7A, pawls 46 and 53 are engaged with ratchet wheel 36 during payout.

It can thus be seen that the present invention provides a fishing reel having a bait click mechanism which produces an audible indication when line is payed out but which automatically remains silent as the fishing line is wound in. While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed is:

1. A fishing reel, said fishing reel comprising:
   a line spool;
   a reel frame carrying the line spool, the line spool being capable of rotation in first and second opposite rotational directions;
   a bait click mechanism providing an audible indication when fishing line is payed out in the line spool's first rotational direction;
   said bait click mechanism employing an arrangement including a pawl and ratchet wheel, the pawl being carried on a side surface of said line spool at a location radially outward of said ratchet wheel for selective engagement therewith, said pawl rotating with the line spool; and
   wherein the bait click mechanism remains substantially silent when fishing line is retrieved in the line spool's second opposite rotational direction.

2. A fishing reel as in claim 1 wherein said pawl pivots into and out of engagement with said ratchet wheel.

3. A fishing reel as in claim 2 wherein the pawl is attached to the line spool with a mounting plate.

4. A fishing reel as in claim 2 wherein the bait click mechanism further comprises a clicking member mechanically linked to the ratchet wheel so that the clicking member and the ratchet wheel rotate together, the clicking member having at least one protrusion extending radially outward.

5. A fishing reel as in claim 4 wherein the bait click mechanism further comprises a tab fixed with respect to said reel frame, the clicking member and the tab arranged so that the at least one protrusion contacts the tab upon rotation of the clicking member.

6. A fishing reel as in claim 5 wherein the ratchet wheel is mounted coaxial to a shaft, the ratchet wheel being capable of rotating relative to the shaft, the ratchet wheel and pawl arranged so that the pawl engages the ratchet wheel in the line spool's first rotational direction while the pawl does not engage the ratchet wheel in the line spool's second opposite rotational direction.

7. A fishing reel as in claim 1 wherein the pawl and ratchet wheel arrangement includes a pair of pawls diametrically opposed to one another.

8. A fishing reel as in claim 6 wherein the line spool is within the reel frame.

9. A fishing reel as in claim 6 wherein the tab is flexible and deflects upon contact with the at least one protrusion.

10. A fishing reel as in claim 9 further comprising a clicking selector, said clicking selector selectably moving the tab between a first position and a second position, the tab being capable of contact with the at least one protrusion in the first position, and the tab not being capable of contact with the at least one protrusion in the second position.

11. A fishing reel as in claim 6 wherein the clicking member comprises a clicking gear fixed and axially adjacent to the ratchet wheel and the at least one protrusion comprises multiple clicking gear teeth arranged about the clicking gear's circumference.

12. A fishing reel, said reel comprising:
    a line spool;
    a reel frame carrying the line spool, the line spool being capable of rotation in first and second opposite rotational directions; and
    a bait click mechanism including:
       a tab fixed with respect to said reel frame,
       a pivotal pawl that rotates with the line spool,
       a ratchet wheel mounted coaxial to a shaft in axial alignment with said pawl, said ratchet wheel being capable of rotating relative to the shaft, the ratchet wheel and pawl arranged so that the pawl pivots into engagement with the ratchet wheel in the line spool's first rotational direction while the pawl does not engage the ratchet wheel in the line spool's second opposite rotational direction,
       a clicking member mechanically linked to the ratchet wheel so that the clicking member and the ratchet wheel rotate together, the clicking member having at least one protrusion extending radially outward, and
       the clicking member and the tab arranged so that the at least one protrusion contacts the tab upon rotation of the clicking member.

13. A fishing reel as in claim 2 wherein a mounting plate is attached to a side surface of said line spool, said pawl being connected to said mounting plate.

14. A fishing reel as in claim 13 wherein the line spool is within the reel frame.

15. A fishing reel as in claim 12 wherein the tab is flexible and deflects upon contact with the at least one protrusion.

16. A fishing reel as in claim 12 further comprising a clicking selector, said clicking selector selectably moving the tab between a first position and a second position, the tab being capable of contact with the at least one protrusion in the first position, and the tab not being capable of contact with the at least one protrusion in the second position.

17. A fishing reel as in claim 12 wherein the shaft extends from the rotational axis of the line spool.

18. A fishing reel as in claim 12 wherein the clicking member comprises a clicking gear fixed and axially adjacent to the ratchet wheel and the at least one protrusion comprises multiple clicking gear teeth arranged about the clicking gear's circumference.

19. A fishing reel, said reel comprising:
    a cylindrical line spool;
    a reel frame, carrying the line spool, the line spool being capable of rotation in first and second opposite rotational directions; and
    a bait click mechanism including:
       a tab, said tab flexibly connected to the reel frame,
       an arrangement including a pawl and a ratchet wheel, the ratchet wheel and pawl arranged so that the pawl engages the ratchet wheel in the line spool's first rotational direction while the pawl does not engage the ratchet wheel in the line spool's second opposite rotational direction,
       a clicking gear mechanically linked to the ratchet wheel so that the clicking gear and the ratchet wheel rotate together, the clicking gear having multiple clicking gear teeth arranged about the clicking gear, the clicking gear and the tab arranged so that the clicking gear teeth contact the tab upon rotation of the clicking gear, and a mounting plate attached to a side surface of said line spool and having a cylindrical extension on which said ratchet wheel and clicking gear are rotatably located, said pawl being connected to said mounting plate at a location radially outward of said ratchet wheel for selective engagement therewith.

20. A fishing reel as in claim 19 wherein the line spool is within the reel frame.

21. A fishing reel as in claim 20 further comprising a clicking selector, said clicking selector selectably moving the tab between a first position and a second position, the tab being capable of contact with a clicking gear tooth in the first position, and the tab not being capable of contact with a clicking gear tooth in the second position.

22. A fishing reel as in claim 20 wherein the shaft extends from the rotational axis of the line spool.

23. A fishing reel as in claim 2 wherein said pawl includes a flexible element pressing against said ratchet wheel to provide a frictional interconnection therebetween.

24. A fishing reel as in claim 23 wherein said flexible element comprises a flexible sheath pressing against both sides of said ratchet wheel.

25. A fishing reel as in claim 12 further comprising a second pawl located at a position diametrically opposite of said pawl.

26. A fishing reel as in claim 12 wherein said pawl includes a flexible element pressing against said ratchet wheel to provide a frictional interconnection therebetween.

27. A fishing reel as in claim 26 wherein said flexible element comprises a flexible sheath pressing against both sides of said ratchet wheel.

28. A fishing reel as in claim 19 further comprising a second pawl located on said mounting plate at a position diametrically opposite of said pawl.

29. A fishing reel as in claim 19 wherein said pawl includes a flexible element pressing against said ratchet wheel to provide a frictional interconnection therebetween.

30. A fishing reel as in claim 29 wherein said flexible element comprises a flexible sheath pressing against both sides of said ratchet wheel.

31. A fishing reel, said fishing reel comprising:

a line spool;

a reel frame carrying the line spool, the line spool being capable of rotation in first and second opposite rotational directions;

a bait click mechanism providing an audible indication when fishing line is payed out in the line spool's first rotational direction;

said bait click mechanism employing an arrangement including a rotatable ratchet wheel and a pair of pawls located radially outward of said ratchet wheel at diametrically opposite positions, said pawls revolving about a rotational axis of said line spool and pivoting into and out of engagement with said ratchet wheel; and wherein the bait click mechanism remains substantially silent when fishing line is retrieved in the line spool's second opposite rotational direction.

32. A fishing reel as in claim 31 wherein said pawls each include a flexible element pressing against said ratchet wheel to provide a frictional interconnection therebetween.

33. A fishing reel as in claim 32 wherein said flexible element comprises a flexible sheath pressing against both sides of said ratchet wheel.

* * * * *